United States Patent
Panigrahi et al.

(10) Patent No.: US 10,417,913 B2
(45) Date of Patent: Sep. 17, 2019

(54) LIGHT IMPACT DETECTION FOR VEHICLE USING LOW COMPUTATION OVERHEAD

(71) Applicant: Ford Global Technologies, LLC, Dearborn, MI (US)

(72) Inventors: Smruti R. Panigrahi, Farmington Hills, MI (US); Jianbo Lu, Northville, MI (US); Sanghyun Hong, Canton, MI (US); Jonathan Scott, Chelmsford (GB); Dimitar P. Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2 days.

(21) Appl. No.: 16/085,374

(22) PCT Filed: Mar. 15, 2016

(86) PCT No.: PCT/US2016/022426
§ 371 (c)(1),
(2) Date: Sep. 14, 2018

(87) PCT Pub. No.: WO2017/160275
PCT Pub. Date: Sep. 21, 2017

(65) Prior Publication Data
US 2019/0088134 A1    Mar. 21, 2019

(51) Int. Cl.
*B60Q 1/00* (2006.01)
*G08G 1/16* (2006.01)
(Continued)

(52) U.S. Cl.
CPC ......... *G08G 1/162* (2013.01); *B60R 21/0132* (2013.01); *B60R 21/0134* (2013.01);
(Continued)

(58) Field of Classification Search
CPC ........ G08G 1/162; G07C 5/085; G07C 5/008; B60R 21/0134; B60R 21/0132; B60R 21/0136; G01L 5/0052
(Continued)

(56) References Cited

U.S. PATENT DOCUMENTS 6,741,168 B2    5/2004  Webb et al.
7,359,821 B1    4/2008  Smith et al.
(Continued)

FOREIGN PATENT DOCUMENTS

GB        2485971 A        6/2012
KR     20140134849 A      11/2014

OTHER PUBLICATIONS

Jing Zhou, Active Safety Measures for Vehicles Involved in Light Vehicle-to-Vehicle Impacts, Mechanical Engineering, University of Michigan, 2009.

*Primary Examiner* — Tanmay K Shah
(74) *Attorney, Agent, or Firm* — Frank A. MacKenzie; MacMillan, Sobanski & Todd, LLC

(57) ABSTRACT

Light or moderate impacts against a vehicle are detected. Measured acceleration and yaw rate are compared to baseline thresholds in a baseline state. When the acceleration is above the threshold, a distance from an estimated impact location to a vehicle center-of-gravity is determined. When the determined distance is less than a vehicle edge distance, an impact-suspected state will be entered if at least one of the acceleration and yaw rate is above the respective threshold for a predetermined duration. In the impact-suspected state, a plurality of vehicle dynamic behaviors are monitored for confirming occurrence of the light impact. A return is made to the baseline state if the acceleration and yaw rate fail to remain above the respective threshold or if the calculated distance fails to remain less than the edge dis- (Continued)

tance. The impact is detected when at least one of the behaviors confirms the occurrence.

20 Claims, 4 Drawing Sheets

(51) Int. Cl.
*B60R 21/0132* (2006.01)
*B60R 21/0136* (2006.01)
*B60R 21/0134* (2006.01)
*G01L 5/00* (2006.01)
*G07C 5/00* (2006.01)
*G07C 5/08* (2006.01)

(52) U.S. Cl.
CPC ........ *B60R 21/0136* (2013.01); *G01L 5/0052* (2013.01); *G07C 5/008* (2013.01); *G07C 5/085* (2013.01)

(58) Field of Classification Search
USPC ............................................. 340/436
See application file for complete search history.

(56) References Cited

U.S. PATENT DOCUMENTS

| | | | |
|---|---|---|---|
| 7,725,216 B2 | 5/2010 | Kim | |
| 8,436,722 B2 | 5/2013 | Roh et al. | |
| 8,768,565 B2 | 7/2014 | Jefferies et al. | |
| 8,825,277 B2 | 9/2014 | McClellan et al. | |
| 9,002,554 B2 | 4/2015 | Chen | |
| 2007/0100521 A1 | 5/2007 | Arae | |
| 2007/0271105 A1 | 11/2007 | Gunderson et al. | |
| 2008/0243327 A1 | 10/2008 | Bujak et al. | |
| 2009/0099735 A1* | 4/2009 | McCoy | B60R 21/0134 701/46 |
| 2011/0166744 A1* | 7/2011 | Lu | B60T 8/1755 701/29.2 |
| 2012/0265408 A1* | 10/2012 | Stabrey | B60T 8/17551 701/46 |
| 2014/0024334 A1* | 1/2014 | Berry | G08G 1/205 455/404.2 |
| 2014/0375446 A1* | 12/2014 | Wanami | G07C 5/0891 340/436 |
| 2014/0379222 A1* | 12/2014 | Rittler | B60R 21/0132 701/45 |
| 2015/0224845 A1* | 8/2015 | Anderson | B60G 17/019 701/37 |

* cited by examiner

LIGHT IMPACT DETECTION FOR VEHICLE USING LOW COMPUTATION OVERHEAD

BACKGROUND OF THE INVENTION

The present invention relates in general to automotive crash detection, and, more specifically, to detecting the occurrence of a light to moderate impact event having a severity less than one that should trigger deployment of a passive restraint such as an air bag.

Vehicle crash detection is a well-developed technology in the context of passive restraint systems which deploy during a crash in order to protect the vehicle occupants. Specialized sensors and robust detection algorithms provide a high reliability in detecting the onset of a crash that has a sufficient severity to automatically activate a passive restraint.

A typical crash sensing system may be comprised of an array of accelerometers, for example. Longitudinal and lateral acceleration sensor signals from the accelerometers can be generated within or communicated to a Restraints Control Module (RCM) which makes a deployment decision. Accelerometers mounted in the RCM have detection ranges from about −50 g to about +50 g. Satellite accelerometers remotely located in the front and sides of the vehicle typically have ranges from about −250 g tom about +250 g. Light to moderate impacts involving lower levels of acceleration cannot be reliably detected using the existing accelerometers. However, there would be benefits to having an ability to detect light impacts, i.e., when the impact severity is less than what the RCM module uses to initiate a restraint deployment.

Although light impacts between vehicles do not cause significant damage to the driver or passenger directly, they could begin a chain of post impact events which can lead to undesired outcomes such as further impacts or rollovers. Therefore, the detection and recording of occurrences of light impact collisions may of interest to vehicle owners, vehicle fleet operators, law-enforcement personnel, and insurance providers. This invention discloses techniques and systems for detecting light impacts to enable many different kinds of reactions such as modified vehicle control, the real-time alerting of third parties (e.g., insurance, fleet, and law enforcement agencies), and the recording/storage of incident information in the vehicle for later use by fleet operators and law enforcement for accident reconstruction.

Known methods for detecting impacts in restraint systems may not be apt for detecting light impacts because they typically require different sensors that may not be well suited to detection of light crashes and they may require significant computing resources and/or data transmission. A typical automotive electronics architecture comprises a plurality of distributed controller modules and sensor devices connected as nodes in a multiplex communication network. In view of the ultimate uses to which the detection of a light impact would be put, an optimal implementation would typically locate the light-impact detection function in a controller module other than a restraints control module (e.g., in a body control module or a powertrain control module) where computing resources may be in short supply. Therefore, it would be desirable to achieve reliable detection of light impact events using low computing overhead while consuming a minimal amount of data traffic over a multiplex controller network.

SUMMARY OF THE INVENTION

Vehicle longitudinal and lateral acceleration, yaw rate, and vehicle speed which are typically being shared between various modules over a high-speed CAN bus are used in the light impact detection algorithm. A body control module (BCM) provides a preferred location for implementing the light impact detection. Sensor signals from accelerometers of the type installed as part of a vehicle dynamics system (e.g., a powertrain controller or a traction control or braking system) have ranges typically between about −10 g to about +10 g, which is enough to detect the light impacts. Vehicle velocity can be derived from wheel speed or from a transmission-based vehicle speed. A fused vehicle speed based on combining vehicle speed estimations from different vehicle systems may be desirable. Vehicle yaw rate (likewise available over a CAN bus from various motion sensors) is monitored to detect unusual or undesired angular velocity and acceleration that would be associated with light-impact conditions. Motion sensor information on roll rate can also be monitored/recorded in order to report the dynamic state in case of a roll-over of the vehicle. A driver's control intent such as throttle position, driver brake pedal travel, driver steering angle, etc. can also be recorded from the high-speed CAN bus to obtain an insight into driver behavior before, during, and after a light impact.

In one aspect of the invention, a method is provided for detecting a light impact against a vehicle. A measured acceleration and a measured yaw rate are compared to respective baseline thresholds in a baseline state. When the acceleration is above the respective baseline threshold, then a center-of-gravity to impact distance is determined according to a mass of the vehicle, a moment of inertia of the vehicle, the measured acceleration of the vehicle, and the measured yaw rate of the vehicle. When the determined distance is less than a vehicle edge distance, then an impact-suspected state is entered if at least one of the acceleration and yaw rate is above the respective baseline threshold for a first predetermined duration. In the impact-suspected state, a plurality of vehicle dynamic behaviors are monitored for confirming occurrence of the light impact, wherein the method returns to the baseline state if the acceleration and yaw rate fail to remain above the respective baseline threshold or if the calculated distance fails to remain less than the vehicle edge distance. A light impact is detected when at least one of the behaviors confirms the occurrence.

DETAILED DESCRIPTION OF PREFERRED EMBODIMENTS

Figure 1:
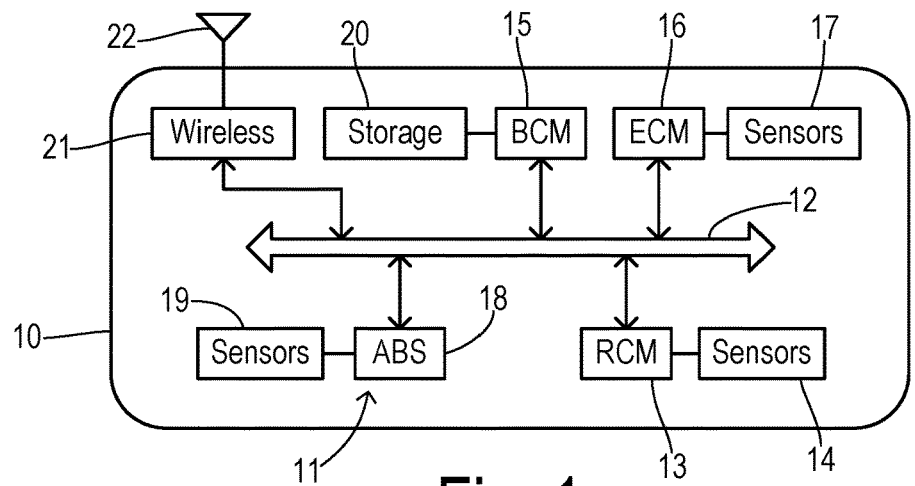
FIG. 1 is a block diagram of a vehicle with a light impact detection and recording system.

Referring to FIG. 1, a vehicle 10 (such as a gas, electric, or hybrid automobile or truck) includes a controller network 11 having various controller modules, sensors, and a multiplex bus 12 (e.g., a CAN bus) for transmitting data signals between the various modules and sensors. Controller modules that may be involved in implementing the present invention include a restraints control module (RCM) 13 with associated sensors 14 such as accelerometers. The passive restraint system would further include actuators such as air bags (not shown) disposed throughout vehicle 10 and connected to RCM 13.

A body control module (BCM) 15, which is coupled to bus 12, is commonly present in a vehicle electrical architecture for performing general vehicle functions. BCM 15 provides one advantageous location for implementing the light impact detection of the invention. Controller network 11 further includes a powertrain controller, shown in this embodiment as an engine control module (ECM) 16 which is coupled to various powertrain sensors 17 such as a speed sensor. The vehicle may also have a traction control module comprised of an antilock brake system (ABS) module 18 connected to associated sensors such as wheel speed sensors.

BCM 15 may include, or is coupled to, a nonvolatile memory or storage 20 to be used in connection with crash detection and reporting. For purposes of accessing remote data and reporting impact events in real-time to remote systems (e.g., law enforcement or insurance companies), a wireless communication module 21 may also be connected with bus 12 to work in cooperation with BCM 15. An antenna 22 is connected to wireless communication module 21 for establishing a data communication channel (e.g., a cellular data connection).

Figure 2:
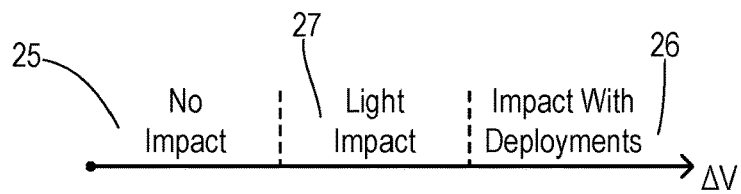
FIG. 2 shows a spectrum of impact severity from light impacts to high severity impacts that result in deployment of passive restraints.

The purpose of the light impact detection function is to detect as quickly as possible an impact that, although not sufficiently severe to trigger deployment of a passive restraint, could create vehicle instability or significantly alter the vehicle's initial kinetic energy (either rotational or linear momentum). This function is not intended to deploy airbags or any other passive restraints. However, sensitivity to impacts needs to be much higher than what is currently used in connection with the restraints controls. FIG. 2 shows the difference between impact severity to be detected by the light impact function versus for air bag deployment. Severity of impact is proportional to a calculated change in velocity ΔV during an event. An Impact With Deployment region 26 resides at high ΔV above an RCM threshold. A No Impact region 25 resides at low ΔV. A Light Impact region 26 resides between regions 25 and 27.

Figure 3:
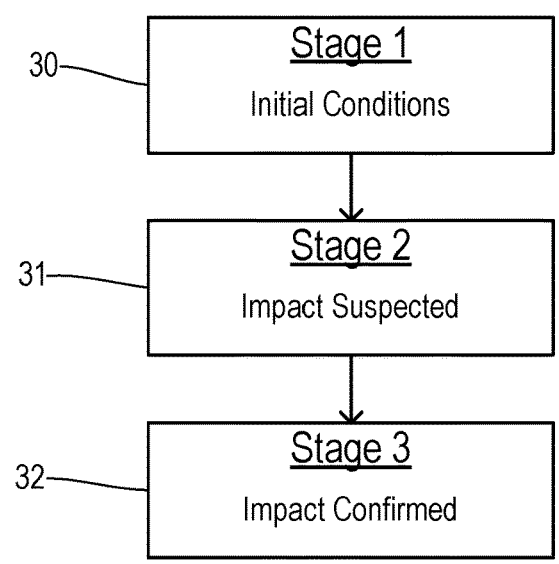
FIG. 3 depicts graduated detection stages utilizing progressively increasing use of computation and data transmission resources as conditions increasingly indicate the possibility of a light impact in progress.

In order to balance the competing objectives of fast, accurate detection and minimal use of computing/multiplexing resources, the invention employs a multi-stage detection strategy as shown in FIG. 3. In Stage 1 shown in block 30, a set of initial or baseline conditions are monitored which are sensitive for a gross indication that an impact may be underway. In particular, vehicle acceleration and/or yaw rate may be used to provide such gross indication. They may be compared to respective thresholds chosen such that the more computation intensive operations to accurately detect a light impact are not conducted when acceleration and yaw rate are so low that an impact is clearly not underway. Stage 1 preferably also includes a validity check based on a computed impact distance between the vehicle center of gravity and an estimated line-of-impact, as described in more detail below.

Stage 2 shown in block 31 is entered when the acceleration or yaw rate monitored in Stage 1 exceed the respective thresholds (and the validity check does not exclude an impact event). Stage 2 provides a delayed response by ensuring that the acceleration/yaw rate stays above the threshold for a predetermined duration (e.g., three consecutive samples) before making a conclusion that occurrence of an impact is suspected. This helps prevent transient errors in measured acceleration or yaw rate from triggering the full monitoring state that is adopted in Stage 3 shown in block 32. Once Stage 3 is entered, more computation-intensive monitoring is performed in an attempt to confirm whether a light impact has occurred.

Figure 4:
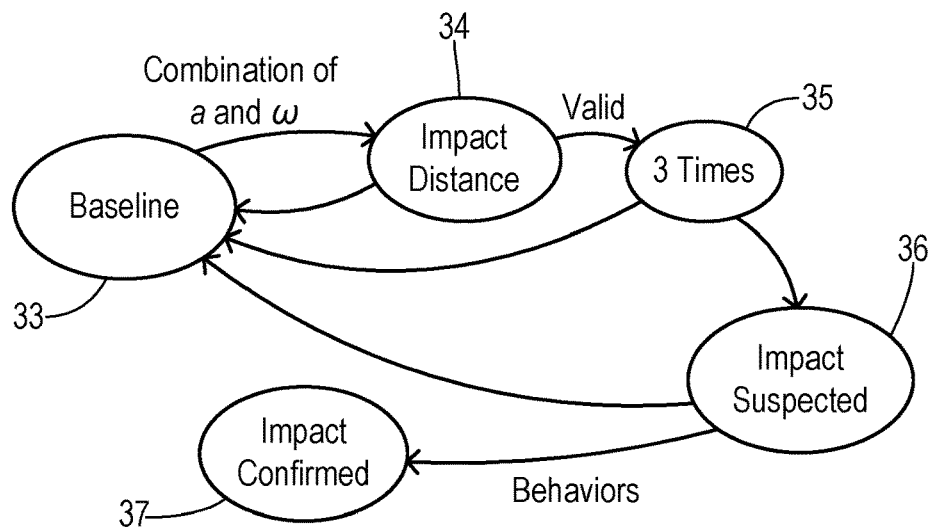
FIG. 4 is a state diagram showing one preferred process of the invention.

FIG. 4 shows a state diagram according to one preferred embodiment of the invention. A baseline state 33 performs the initial monitoring wherein vehicle acceleration and/or yaw rates are compared to respective predetermined thresholds. In particular, a total vehicle acceleration a may preferably be determined based on a square root of the sum of the squares of measured longitudinal acceleration $a_x$ and a measured lateral acceleration $a_y$. The measured accelerations may be obtained by the body controller module from a powertrain control module over the CAN bus, for example. Acceleration thresholds AccelerationCalibration1 and AccelerationCalibration2, and yaw rate threshold YawRateCalibration1 may be used as conditions to trigger the Stage-1 impact detection logic. Stated more formally, an "in impact" condition may be detected in a controller module according to the following pseudo-code:

```
If ( ( √(a_x(z_2)² + a_y(z_2)²) > AccelerationCalibration1 )
    OR
    ( ω_z2 > YawRateCalibration1
        AND √(a_x(z_2)² + a_y(z_2)²) > AccelerationCalibration2 ) ) {
    InImpact[z_2] = 1;
}
Else {
    InImpact[z_2] = 0;
}
``` where z is a time index wherein times $z_1$, $z_2$, and $z_3$ are consecutive samples taken at a time step interval ΔT and where $z_2$ is the current sample and $z_1$ is the previous sample, g is gravitational constant, and InImpact is a flag which will be used to detect a duration for which the condition remains true.

In state 34, a validity check is performed based on an impact distance, i.e., if the impact distance fails to reside within the boundary edges of the vehicle then the vehicle dynamics would correspond to an impact occurring outside the vehicle perimeter, which is not possible. Thus, the validity check helps to eliminate any false impact detection. The validity check can be performed either before or after the above test for determining the setting of the InImpact flag. If performed after the InImpact flag has been set and the validity check finds an invalid result, then the InImpact flag for the current sample period z is reset to 0. If performed before the InImpact comparison, then an additional test would need to be introduced before the validity check to ensure that acceleration a is above a threshold AccelerationCalibration1 in order to avoid undefined values as described below. Thus, it may be preferably to perform the validity check after setting of the InImpact flag as shown in FIG. 4.

Figure 5:
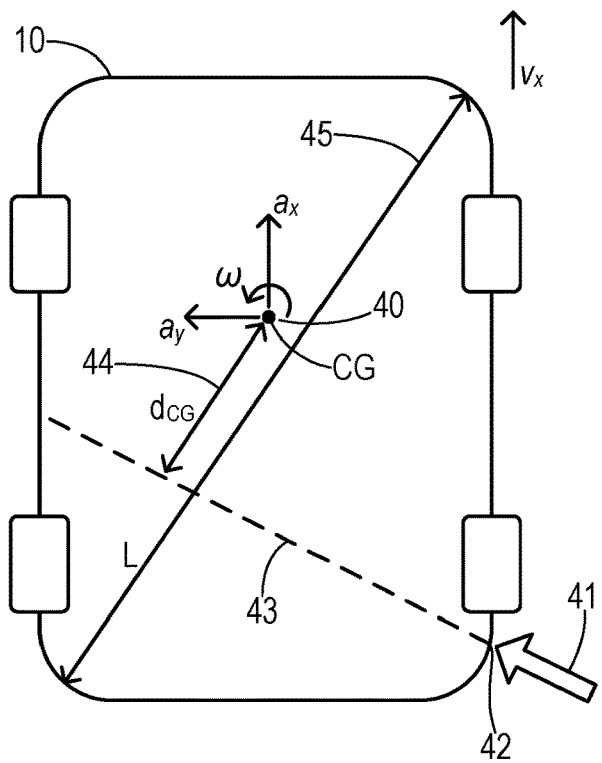
FIG. 5 is a diagram depicting a vehicle center-of-gravity, a point of impact, and an impact distance.

The concepts for checking the impact distance are illustrated in FIG. 5. Vehicle 10 has a center of gravity (CG) 40, typically slightly forward from the center of vehicle 10. An impacting object 41 strikes vehicle 10 at an impact point 42 when moving along a line of impact 43. An impact distance 44 is the shortest distance from CG 40 to line 43, and is designated $d_{CG}$. Distance $d_{CG}$ is necessarily less than the longest distance from CG 40 to a vehicle edge, which may be approximated as one-half of a diagonal length L of the vehicle. FIG. 5 also indicates longitudinal acceleration $a_x$, lateral acceleration $a_y$, and yaw rate $\omega$ which are defined with respect to CG 40, and a vehicle forward velocity $V_x$.

Impact distance $d_{CG}$ is preferably calculated from the moment of inertia of the vehicle using the following formula:

$$d_{CG} = \frac{J\left(\frac{\omega[z_2] - \omega[z_1]}{t[z_2] - t[z_1]}\right)}{m\sqrt{a_x[z_2]^2 + a_y[z_2]^2}}$$

where m is the mass of the vehicle and J is the moment of inertia about CG 40. Impact distance is computed only when the total acceleration exceeds a predetermined threshold so that the above calculation does not involve dividing by zero.

To reduce noise in the computation (due to inherent noise in the CAN-based acceleration and yaw-rate signals) and for more accurate estimation of the impact distance, a recursive least square (RLS) algorithm is preferably used in computing the impact distance from the CG. Thus, the validity check can proceed as follows:

If $\left(\sqrt{a_x(z_2)^2 + a_y(z_2)^2} > AccelerationCalibration1\right)$ {

Compute $d_{CG}$ using real-time RLS;

}

Else {

$d_{CG}(z_2) = -1$;

} where the result of −1 is used to indicate there is no impact (since no impact distance is calculable). When the real-time RLS algorithm returns a computed value, it is compared to the vehicle edge distance (e.g., L/2), and if $d_{CG}$ is greater than L/2 then InImpact[$z_2$] is set to zero.

In state 35 of FIG. 4, a delayed confirmation of the InImpact flag is used to determine the value of an Impact_Suspected flag. If the last three consecutive InImpact flags are 1, then the Impact_Suspected flag changes from 0 to 1. In the following pseudo-code, $z_1$, $z_2$, and $z_3$ are the last three samples and the consecutive impact flags are InImpact[$z_1$], InImpact[$z_2$], and InImpact[$z_3$]:

```
if InImpact[z₁]== 1 && InImpact[z₂]== 1 && InImpact[z₃]== 1
    Impact_Suspected[z₃]= 1;
else
    Impact_Suspected[z₃]= 0;
End
```

When Impact_Suspected[$z_3$] equals 1, then the method proceeds to state 36, otherwise it returns to baseline state 33.

In state 36, the Impact_Suspected flag is used to trigger tests of various dynamic behaviors that are more computation intensive but that are able to confirm the occurrence of a light impact. The dynamic behaviors may include checking for threshold values of the skidding of the front and rear tires, longitudinal and lateral velocity changes, continued excessive acceleration or yaw rate, and lane departure speed, for example. Each of these behaviors is described in more detail below. Should any one of the behaviors be detected, then there is a transition to an impact-confirmed state 37. In state 37, details of the occurrence can be stored, transmitted off-board for reporting purposes or wireless warning nearby vehicles, or used to modify operation of the host vehicle such as by changing powertrain characteristics or modifying operation of the passive restraint system since chances of a larger secondary impact may be elevated.

A first dynamic behavior is a "shortest plausible time" wherein the Impact_Suspected flag is integrated over time, denoted by InImpactTime. An impact is confirmed when Impact_Suspected flag is activated and InImpactTime exceeds a pre-defined threshold value ImpactDurationCalibration1. For example, with a $\Delta T$ sampling interval, an integration threshold value of ImpactDurationCalibration1 ($>\Delta T$) has been used.

Another dynamic behavior is Change in Longitudinal Velocity. This is calculated by integrating the longitudinal acceleration $a_x$ as follows:

$$LongVchange = \int_0^t a_x dt.$$

When an impact is suspected, LongVchange is checked against a threshold value SpeedChangeCalibration1. When the condition abs(LongVchange)>SpeedChangeCalibration1 is satisfied, then the Impact_Confirmed flag changes from 0 to 1.

Another dynamic behavior is Change in Lateral Velocity. This is calculated by integrating the lateral acceleration $a_y$:

$$LatVchange = \int_0^t a_y dt.$$

When an impact is suspected, LatVchange is checked against a threshold value SpeedChangeCalibration2. When the condition abs(LatVchange)>SpeedChangeCalibration2 is satisfied, then the Impact_Confirmed flag changes from 0 to 1.

The next dynamic behavior is Rate of Side-Slip Due to Yaw Motion and Lateral Acceleration. This flag checks whether the front or the rear tires exceed a threshold predefined sideslip value. The computations of the sideslips are done using the following physics based model. First, the lateral acceleration $a_{lateral}$ is computed using the measured sensor data $a_y$, $\omega_z$, and $v_x$ such that $$a_{lateral} = a_y - \omega_z \times v_x.$$

Then the lateral velocity is $$v_{lateral} = \int_0^t a_{lateral} dt.$$

The lateral velocity due to angular yaw rate, $\omega_z$, is $$v_{angularFT} = \omega \times d_{FT} \text{ for front tires, and}$$

$$v_{angularRT} = \omega \times d_{RT} \text{ for rear tires.}$$

The total lateral velocities of the front and the rear tires are $v_{lateralFT} = v_{lateral} + v_{angularFT}$ for front tires, and $v_{lateralRT} = v_{lateral} - v_{angularRT}$ for rear tires.

So, the sideslip ratios for the front tire and the rear tire are $SideSlip_{FT} = v_{lateralFT}/v_x$ for front tires, and $SideSlip_{RT} = v_{lateralRT}/v_x$ for rear tires.

Then the impact confirmation is obtained by using predefined threshold values, SideSlipCalibration1 and SideSlipCalibration2, of the side slip ratios for the front and the rear axles.

For the front axle, corresponding pseudo-code is

```
if abs(SideSlipFT[z])> SideSlipCalibration1
    Impact_Confirmed[z]= 1
else
    Impact_Confirmed[z]= 0;
end
``` and for the rear axle it is

```
if abs(SideSlipRT(z))> SideSlipCalibration2
    Impact_Confirmed[z]= 1
else
    Impact_Confirmed[z]= 0;
end.
```

Another dynamic behavior is a Yaw Rate Threshold. This threshold is set for the yaw rate so that unusually high angular velocity of the vehicle is detected, as follows:

```
if abs(ω_z[z]) > YawRateCalibration2
    Impact_Confirmed[z] = 1
else
    Impact_Confirmed[z] = 0;
end.
```

The predetermined value for threshold YawRateCalibration2 may be about 1 radian per second, for example.

Another dynamic behavior for confirming a light impact is a Lane-Departure Acceleration Threshold. The lane departure acceleration is calculated by multiplying the yaw rate and the vehicle longitudinal velocity. If this lateral acceleration exceeds a threshold value AccelerationCalibration3 then an impact is confirmed as follows:

```
if abs(ω_z[z] V_x[z]) > AccelerationCalibration3
    Impact_Confirmed[z] = 1
else
    Impact_Confirmed[z] = 0;
end.
```

Any one of the vehicle dynamics behaviors described above is sufficient to conclude that a light impact has occurred. Each behavior can be monitored using measured variables that are commonly available within a controller network over a multiplex bus in a vehicle. Other dynamics behaviors can also be employed, depending upon the available sensor inputs.

Figure 6A:
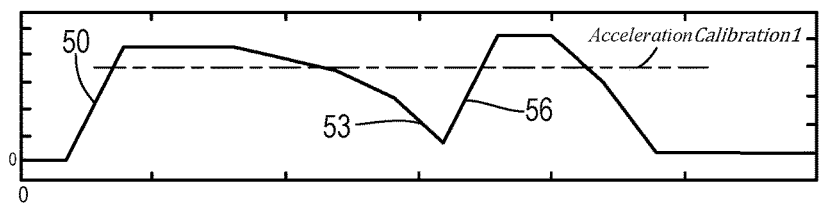
FIGS. 6A-6E are graphs showing example vehicle dynamics measurements, calculations, and detection flags used in one embodiment of the invention.
Figure 6B:
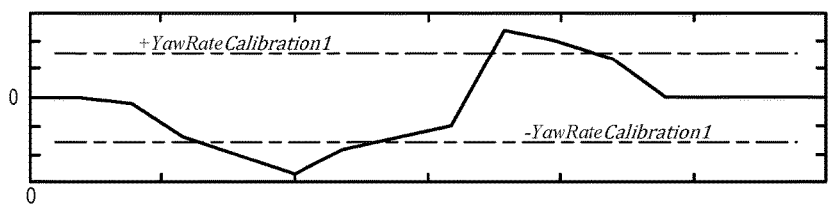
Figure 6C:
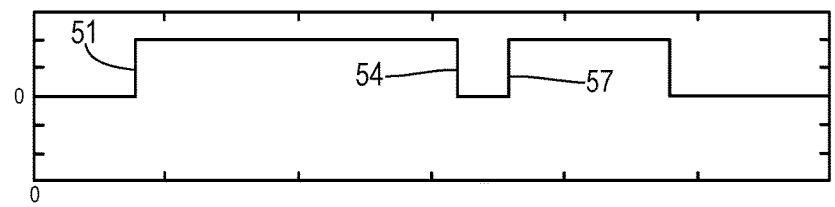

FIGS. 6A-6F show sample waveforms for various signals during operation of the invention. FIG. 6A depicts total vehicle acceleration a which rises from a zero value to a higher value along a trajectory 50. In the depicted example, the acceleration rises above the respective threshold so that a light impact will be suspected. FIG. 6B shows the yaw rate which does not change much initially. Yaw rate would be more indicative of an impact that is not aligned with the current vehicle heading and not aligned with the center of gravity. FIG. 6C shows the InImpact flag which transitions from a logic level of 0 to a logic level of 1 at segment 51 which coincides with the time when acceleration rises above the corresponding threshold in FIG. 6A. In FIG. 6A, the acceleration remains high for a certain length of time until the measured acceleration decreases along a trajectory 53. As a result, the InImpact flag transitions back to 0 at 54 in FIG. 6C. In FIG. 6A, acceleration then rises again along a trajectory 56 which results in the InImpact flag going back to a value of 1 at 57 in FIG. 6C.

Figure 6D:
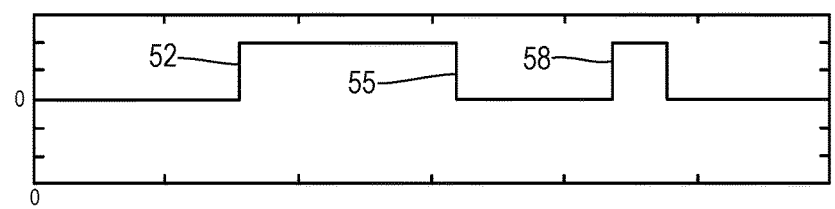

FIG. 6D shows the Impact_Suspected flag which goes from 0 to 1 at a transition 52 which coincides with the InImpact flag having remained at the high logic level for the predetermined duration, such as three consecutive sample periods. The Impact_Suspected flag returns to a 0 value at 55 simultaneously with the negative transition at 54 of the InImpact flag in FIG. 6C. After the InImpact flag stays at a high logic level of 1 for the predetermined period of time after transitioning at 57, the Impact_Suspected flag also returns to a high logic level value of 1 at transition 58 in FIG. 6D.

Figure 6E:
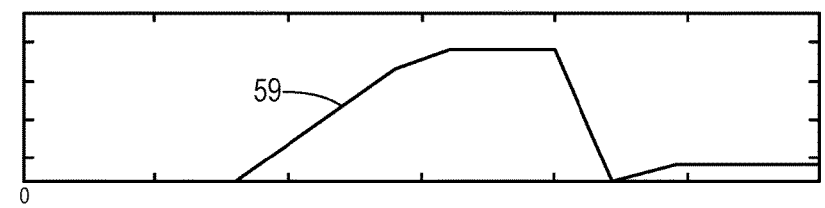

FIG. 6E depicts a vehicle dynamics behavior for confirming a light impact wherein the Impact_Suspected flag is integrated. Thus, when the signal in FIG. 6D has a high logic level, the integration value in FIG. 6E increases as shown at segment 59. An impact confirmed flag may be set when the integrated value in FIG. 6E passes the corresponding threshold. This behavior corresponds to confirming the light impact when at least one of the acceleration or yaw rate remains above the respective baseline threshold for a second predetermined duration greater than the first predetermined duration.

Figure 7:
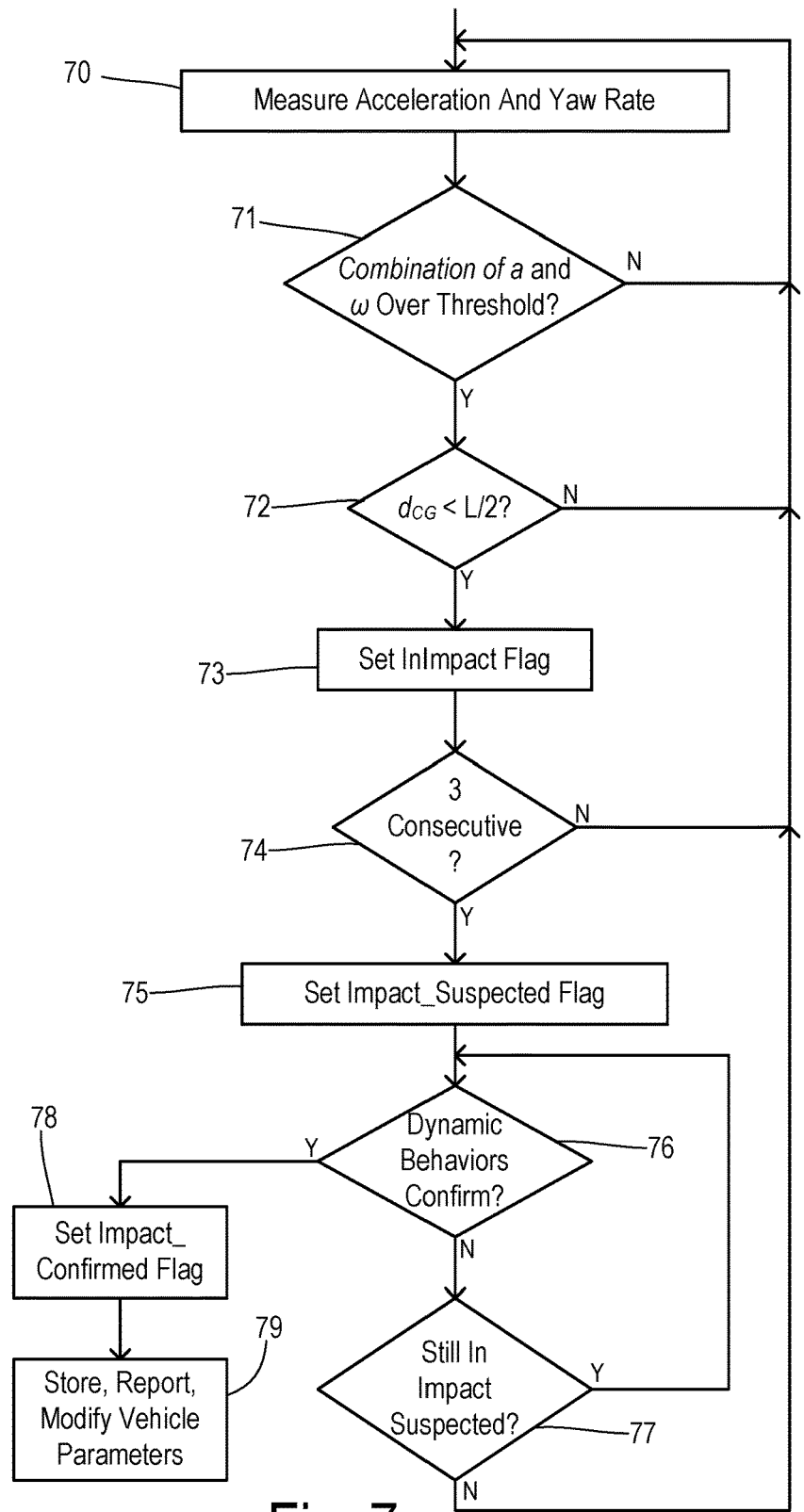
FIG. 7 is a flowchart showing one preferred method of the invention.

A method of the invention is shown in FIG. 7 wherein acceleration and yaw rate are measured in step 70. A check is performed in step 71 to determine whether total vehicle acceleration or yaw rate exceed the respective baseline thresholds. If not, then return is made to step 70 for obtaining additional measurements. If a threshold is exceeded, then a check is performed in step 72 to determine whether the impact distance is less than the vehicle edge distance. If it is not, then the excessive acceleration or yaw rate is not indicative of a valid impact, and return is made to step 70. If the impact distance is less than the vehicle edge distance (and not equal to −1 when that is being used to indicate that the impact distance cannot be determined), then the InImpact flag is set in step 73. Then a check is performed in step 74 to determine whether the three most recent samples all resulted in the InImpact flag being set to 1. If no, then return is made to step 70 for further measurements.

If three consecutive sample periods have the InImpact flag set in step 74, then the Impact_Suspected flag is set in step 75. Then vehicle dynamic behaviors are examined in step 76 to determine whether any one of them confirms an impact. If not, then a check is performed in step 77 to determine whether the possible presence of an impact is still suspected and, if so, then a return is made to step 76 to continue monitoring dynamic behaviors. Otherwise, a return is made to step 70. In the event that a dynamic behavior confirms an impact, then the Impact_Confirmed flag is set in step 78. Then details of the light impact can be stored, reported, or used to modify vehicle operating parameters in step 79.

What is claimed is:

1. A method of detecting a light impact against a vehicle, comprising:
    (a) comparing a measured acceleration and a measured yaw rate to respective baseline thresholds in a baseline state;
    (b) when the acceleration is above the respective baseline threshold, then determining a center-of-gravity to impact distance according to a mass of the vehicle, a moment of inertia of the vehicle, the measured acceleration of the vehicle, and the measured yaw rate of the vehicle;
    (c) when the determined distance is less than a vehicle edge distance, then entering an impact-suspected state when at least one of the acceleration and yaw rate is above the respective baseline threshold for a first predetermined duration;
    (d) in the impact-suspected state, monitoring a plurality of vehicle dynamic behaviors for confirming occurrence of the light impact, wherein the method returns to the baseline state if the acceleration and yaw rate fail to remain above the respective baseline threshold or if the determined distance fails to remain less than the vehicle edge distance; and
    (e) detecting the light impact when at least one of the behaviors confirms the occurrence.

2. The method of claim 1 wherein the behaviors include:
    confirming the light impact when at least one of the acceleration and yaw rate remains above the respective baseline threshold for a second predetermined duration greater than the first predetermined duration.

3. The method of claim 1 wherein the behaviors include:
    determining a difference in vehicle velocities measured at two different times; and
    confirming the light impact when the difference is greater than a predetermined difference.

4. The method of claim 3 wherein the vehicle velocities are longitudinal velocities.

5. The method of claim 3 wherein the vehicle velocities are lateral velocities.

6. The method of claim 1 wherein the behaviors include:
    determining a side slip ratio for each of a front axle and a rear axle of the vehicle; and
    confirming the light impact when at least one of the side slip ratios is greater than a predetermined side slip ratio.

7. The method of claim 1 wherein the behaviors include:
    confirming the light impact when the yaw rate exceeds a predetermined maximum angular velocity.

8. The method of claim 1 wherein the behaviors include:
    determining a lane departure acceleration in response to the yaw rate and a longitudinal velocity of the vehicle; and
    confirming the light impact when the lane departure acceleration exceeds a lane departure threshold.

9. The method of claim 1 wherein the center-of-gravity to impact distance is further determined according to a recursive least squares fit.

10. The method of claim 1 wherein the measured acceleration is comprised of a total acceleration derived from measured longitudinal acceleration and measured lateral acceleration.

11. A vehicle apparatus comprising:
    vehicle dynamics sensors measuring vehicle acceleration and yaw;
    a controller network with at least one controller module communicatively coupled to the dynamics sensors, wherein the controller network:
        a) compares a measured acceleration and a measured yaw rate to respective baseline thresholds in a baseline state;
        b) if the acceleration is above the respective baseline threshold, determines a center-of-gravity to impact distance according to a mass of the vehicle, a moment of inertia of the vehicle, the measured acceleration of the vehicle, and the measured yaw rate of the vehicle;
        c) if the determined distance is less than a vehicle edge distance, then enters an impact-suspected state when at least one of the acceleration and yaw rate is above the respective baseline threshold for a first predetermined duration;
        d) in the impact-suspected state, monitors a plurality of vehicle dynamic behaviors for confirming occurrence of the light impact, wherein the controller network returns to the baseline state if the measured acceleration and yaw rate fail to remain above the respective baseline threshold or if the determined distance fails to remain less than the vehicle edge distance; and
        e) detects the light impact when at least one of the behaviors confirms the occurrence.

12. The vehicle apparatus of claim 11 further comprising non-volatile storage for recording data associated with the confirmed light impact including a time, a date, and a location.

13. The vehicle apparatus of claim 11 further including a passive restraint system triggered in response to impacts having a severity greater than a severity of the light impact, wherein the passive restraint system performs an impact detection function that is adjusted in response to confirmation of a light impact.

14. The vehicle apparatus of claim 11 wherein the behaviors include:
    confirming the light impact when at least one of the acceleration and yaw rate remaining above the respective baseline threshold for a second predetermined duration greater than the first predetermined duration.

15. The vehicle apparatus of claim 11 wherein the behaviors include:
    determining a difference in vehicle velocities measured at two different times; and
    confirming the light impact when the difference is greater than a predetermined difference.

16. The vehicle apparatus of claim 11 wherein the behaviors include:
    determining a side slip ratio for each of a front axle and a rear axle of the vehicle; and
    confirming the light impact when at least one of the side slip ratios is greater than a predetermined side slip ratio.

17. The vehicle apparatus of claim 11 wherein the behaviors include:
    confirming the light impact when the yaw rate exceeds a predetermined maximum angular velocity.

18. The vehicle apparatus of claim 11 wherein the behaviors include:
    determining a lane departure acceleration in response to the yaw rate and a longitudinal velocity of the vehicle; and
    confirming the light impact when the lane departure acceleration exceeds a lane departure threshold.

19. The vehicle apparatus of claim 11 wherein the center-of-gravity to impact distance is calculated according to a recursive least squares fit.

20. The vehicle apparatus of claim 11 wherein the measured acceleration is comprised of a total acceleration derived from measured longitudinal acceleration and measured lateral acceleration.

* * * * *